United States Patent
Karjoth et al.

(10) Patent No.: US 8,786,405 B2
(45) Date of Patent: Jul. 22, 2014

(54) PRIVACY METHOD, DEVICE AND COMPUTER PROGRAM

(75) Inventors: Guenter Karjoth, Waedenswil (CH); Christopher Mark Kenyon, Dublin (IE); Luke James O'Connor, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1812 days.

(21) Appl. No.: 11/944,481

(22) Filed: Nov. 23, 2007

(65) Prior Publication Data

US 2008/0122580 A1  May 29, 2008

(30) Foreign Application Priority Data

Nov. 23, 2006  (EP) ..................................... 06124661

(51) Int. Cl.
*H04Q 5/22* (2006.01)
*G08B 13/14* (2006.01)

(52) U.S. Cl.
USPC ........ 340/10.1; 340/10.2; 340/10.3; 340/10.4; 340/572.1

(58) Field of Classification Search
CPC .......................... G06K 7/0008; G06K 19/0723
USPC ......... 340/502–506, 523, 532, 539.1, 539.11, 340/539.16, 539.19, 539.31, 568.1, 572.1, 340/572.3, 572.4, 10.1–10.4; 370/345, 445
See application file for complete search history.

(56) References Cited

U.S. PATENT DOCUMENTS

| | | | | |
|---|---|---|---|---|
| 6,061,344 A * | 5/2000 | Wood, Jr. | ...................... | 370/346 |
| 6,853,294 B1 * | 2/2005 | Ramamurthy et al. | ...... | 340/10.1 |
| 6,933,848 B1 * | 8/2005 | Stewart et al. | ............. | 340/572.3 |
| 6,946,950 B1 * | 9/2005 | Ueno et al. | .................... | 340/10.1 |
| 6,970,070 B2 * | 11/2005 | Juels et al. | .................... | 340/10.1 |
| 7,218,229 B2 * | 5/2007 | Boyd | ......................... | 340/572.1 |
| 7,253,717 B2 * | 8/2007 | Armstrong et al. | .......... | 340/10.2 |
| 7,497,384 B2 * | 3/2009 | Powell et al. | ................. | 235/492 |
| 7,626,488 B2 * | 12/2009 | Armstrong et al. | .......... | 340/10.2 |
| 7,830,948 B2 * | 11/2010 | Schaefer et al. | .............. | 375/140 |
| 7,916,023 B2 * | 3/2011 | Rado | .......................... | 340/572.1 |
| 7,916,026 B2 * | 3/2011 | Johnson et al. | ............ | 340/572.1 |
| 7,982,584 B2 * | 7/2011 | Bae et al. | ..................... | 340/10.1 |
| 2003/0072322 A1 * | 4/2003 | Collins et al. | ................. | 370/445 |
| 2004/0100359 A1 * | 5/2004 | Reade et al. | ................... | 340/5.2 |
| 2004/0223481 A1 * | 11/2004 | Juels et al. | .................... | 370/345 |

\* cited by examiner

*Primary Examiner* — Daniel Wu
*Assistant Examiner* — Mohamed Barakat
(74) *Attorney, Agent, or Firm* — William Stock; Anne Vachon Dougherty (57) ABSTRACT

The present invention relates to a privacy method for responding to read request. The present invention further relates to a device for generating a response signal and a computer program product. Methods and systems in accordance with embodiments of the invention validate, whether a read request is directed at a target tag to be protected, and, upon a match, respond to the read request by sending a response signal.

17 Claims, 3 Drawing Sheets

PRIVACY METHOD, DEVICE AND COMPUTER PROGRAM

TECHNICAL FIELD

The present invention relates to privacy protection in RFID systems. In particular, the present invention relates to a privacy method for responding to a read request. The present invention also relates to a device for generating a response signal and a computer program product.

BACKGROUND OF THE INVENTION

RFID (radio frequency identification) tags provide simple and cost effective means to tag a variety of goods by transmitting a unique serial number or other identifying information to a reader in response to a query from a reader. RFID tags can be read if they are in the range of a reader, typically up to a few meters for appropriate readers, multiple tags can be interrogated by the same reader, and without readers being within line-of-sight to the tag. These properties can ease management of goods all the way from manufacturing to retailing, for example in warehouse logistics, at checkout tills and so on.

However, as RFID tags can be read secretly, i.e. without the person carrying the tag noticing it, privacy issues may arise. In particular, customers may be traced and classified according to their purchased goods even beyond the point of sale.

Various approaches have been suggested to protect the privacy of customers. One solution is to effectively disable the RFID tags once the attached good has left the supply chain, for example at checkout tills. For this purpose, a so called "kill" request can be issued to an RFID tag, as disclosed in an article by K. P. Fishkin, S. Roy and D. Jiang titled "Some methods for privacy in RFID communication", published in the European Workshop on Security in Ad-Hoc and Sensor Networks (ESAS 2004), LNCS 3313, pages 42 to 53, Springer 2004. However, added hardware has to be included in the RFID tag and is not transparent to customers.

Another approach includes physically removing or disconnecting at least parts of the RFID tag. Such an approach has been suggested by G. Karjoth and P. A. Moskowitz in a paper titled "Disabling RFID Tags with Visible Confirmation: Clipped Tags are Silenced" in the proceedings of the 2005 ACM Workshop on Privacy in the Electronic Society (WPES 05), ACM press. Again, RFID tags need to be modified for this approach.

Finally, a blocker device as disclosed in US patent application US 2004/0223481 A1 can be used to disturb or jam radio frequency communication between RFID tags and readers. A blocker device enables blocking of parts of an address space having a predefined prefix. Thus, it may also block legitimate read requests, for example at a supermarket checkout. Further, smart readers may still identify tags due to the characteristic of the blocked paths.

Consequently, there exists a need for improved methods and devices for protecting privacy in RFID systems.

SUMMARY OF THE INVENTION

According to an embodiment of one aspect of the present invention, a privacy method is disclosed. The privacy method comprises the steps of:
reading at least one data value characteristic for a target tag that is to be protected,
detecting a read request satisfying a specified condition,
validating, if the read request is directed at the target tag, and
responding to the read request by sending a response signal if the read request is directed at the target tag, such that the response signal collides with a further response signal of the target tag.

By reading at least one data value characteristic for a target tag that is to be protected, and responding to a read request by sending a response signal in case the read request satisfies a specified condition and is directed at the target tag, reading of selected target tags can be prevented. The target tag to be protected need not be modified. Target tags may comprise tags a person is carrying, which are to be protected from being read by illegitimate read requests.

According to an embodiment of the first aspect, in the step of reading, a target tag identifier of the target tag is read, in the step of detecting, a read request comprising a specified prefix is detected, and, in the step of validating, the specified prefix is compared with the target tag identifier.

By comparing target tag identifiers, e.g. a fixed serial number of an RFID label, with a prefix transmitted as part of a read request, e.g. in accordance to the RFID protocol, read requests directed at the target tag can be detected with ease.

According to an embodiment of the first aspect, the privacy method further comprises the steps of:
generating a first set of tag identifiers,
comparing the specified prefix with all tag identifiers of the first set of tag identifiers, and
responding to the request by sending a response signal if the specified prefix matches the target tag identifier or any one of the tag identifiers of the first set of tag identifiers.

By generating, comparing and responding to a first set of tag identifiers in addition to the target tag identifier, a target tag can be hidden in a first set of tag identifiers.

If the first set of tag identifiers is generated based on a random distribution of tag identifiers, no conclusions can be drawn from the elements comprised in the first set of tag identifiers, thus improving privacy.

If the first set of tag identifiers is generated based on data associated with the target tag identifier, a response specific for the target tag to be protected can be generated without disclosing the target tag identifier, thus improving privacy.

If the first set of tag identifiers is generated based on a user selected profile, a response desired by a user can be triggered in a system scanning for tags.

According to a further embodiment of the first aspect, the method further comprises the steps of detecting a change of a read situation, and regenerating the first set of tag identifiers for each detected read situation. Consequently, an individual tag cannot be tracked across different read situations, e.g. when going into different shops in a shopping mall whose data may be aggregated. By regenerating the first set of tag identifiers for each read situation, the response generated by the privacy method can be modified, such that tracking of customers becomes virtually impossible to achieve.

According to a further embodiment of the first aspect, the change of read situation is detected, if no read request is received within a given time period. By detecting a predefined pause between read requests, an automatic detection of a new read situation can be performed.

According to a further embodiment of the first aspect, the change of the read situation is indicated by user input. By allowing user input to indicate a new read situation, the user has full control of when to allow or disallow tracking.

According to a further embodiment of the first aspect, the method further comprises the step of specifying a second set of tag identifiers not to be disturbed, wherein tag identifiers comprised in the second set are excluded from the first set.

By specifying a second set of tag identifiers not to be disturbed, legitimate read request to predefined tags will not be disturbed by the privacy method.

According to an embodiment of a second aspect of the present invention, an anonymizer device is disclosed. The anonymizer device solves the individual privacy problem by disturbing specific read attempts to prevent linkability of individuals between different read situations. The anonymizer device makes use of advanced blocking policies to achieve specific privacy goals. For this, the anonymizer device comprises a tag reader adapted to read a target tag identifier of a target tag to be protected, a memory device, operationally connected to the tag reader and adapted to store at least one read target tag identifier, and a read request detector adapted to detect a read request comprising a prefix. The anonymizer device further comprises a comparator, operationally connected to the memory device and the read request detector and adapted to compare one or more tag identifiers stored in the memory device with the prefix of the detected read request, and a response signal generator, operationally connected to the comparator and adapted to generate a response signal if a comparison performed by the comparator results in a match.

An anonymizer device as disclosed above can be carried by a user in order to protect his or her privacy by monitoring for and responding to read requests directed at target tags to be protected.

According to an embodiment of the second aspect, the anonymizer device further comprises a tag identifier generator adapted to generate and store in the memory device a first set of tag identifiers.

Using a tag identifier generator to generate and store tag identifiers in addition to the read target sequence allows hiding the target tag identifier in the first set of tag identifiers.

According to a further embodiment of the second aspect, the anonymizer device further comprises a profile selector adapted to select a profile associated with a first set of tag identifiers. A profile selector allows a user to control responses generated by the anonymizer device according to a profile. This can be used to control privacy or to generate a desired response to read requests.

According to an embodiment of a third aspect of the present invention, a computer program product comprising a computer program is disclosed. The computer program comprises program instructions that, on execution using a processing device of an anonymizer device, perform the steps of:
  reading at least one target tag identifier of a target tag to be protected,
  detecting a read request satisfying a specified condition,
  validating, if the read request is directed at the target tag, and
  responding to the read request by sending a response signal if the read request is directed at the target tag, such that the response signal collides with a further response signal of the target tag.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The drawings are illustrating.

DETAILED DESCRIPTION OF THE DRAWINGS

Figure 1:
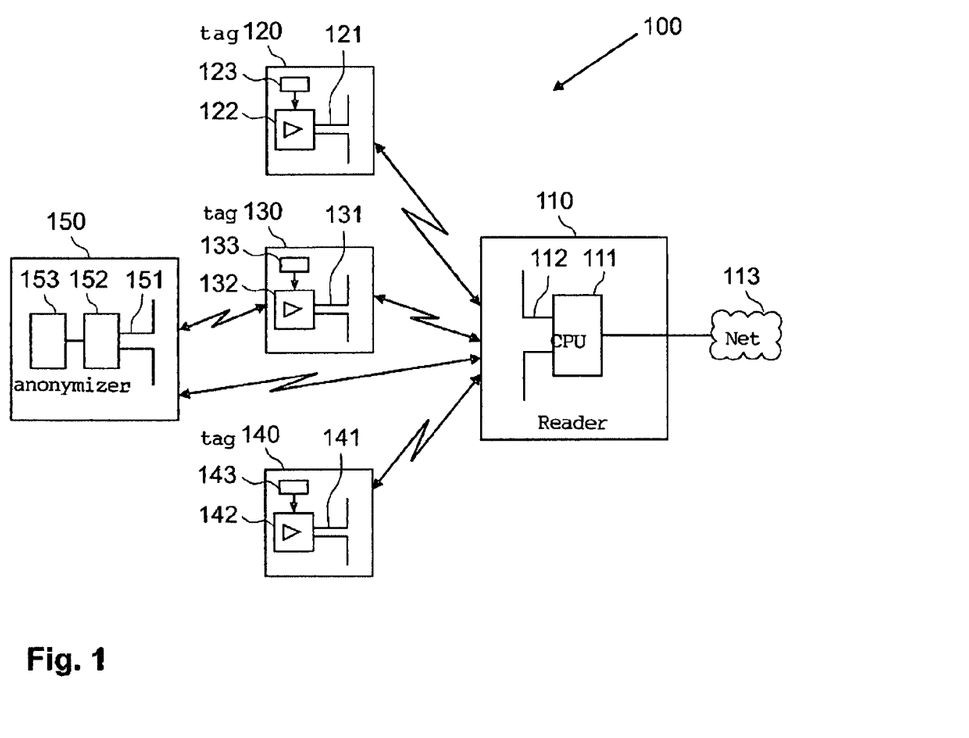
FIG. 1, an RFID system comprising a tag reader, target tags and an anonymizer device.

FIG. 1 shows an RFID system 100. The RFID system 100 comprises a tag reader 110, three target tags 120, 130 and 140, and an anonymizer device 150. The tag reader 110 can request responses from the target tags 120, 130 and 140 by read requests of a radio communication protocol, in particular queries of an RFID reader in accordance with the RFID protocol. For this purpose, the tag reader 110 comprises a processing unit 111 and an antenna 112. In addition, the tag reader 110 may be connected to a data network 113 for transmitting data read by it.

Each of the target tags 120, 130 and 140 also comprise an antenna 121, 131 and 141, respectively. In addition, each target tag 120, 130 and 140 comprises a comparator 122, 132 and 142, which compares a stored target tag identifier 123, 133 and 143 with a received read request, respectively.

The anonymizer device 150 comprises an antenna 151, a processing unit 152 and a memory device 153. The anonymizer device 150 can communicate by means of the radio transmission protocol with both the target tags 120, 130 and 140 and the tag reader 110.

The detailed interaction between the components of the RFID system 100 will be described below. At first, however, the so called "tree singulation" algorithm used by the tag reader 110 will be described in order to allow understanding the way the RFID system 100 works.

Figure 2:
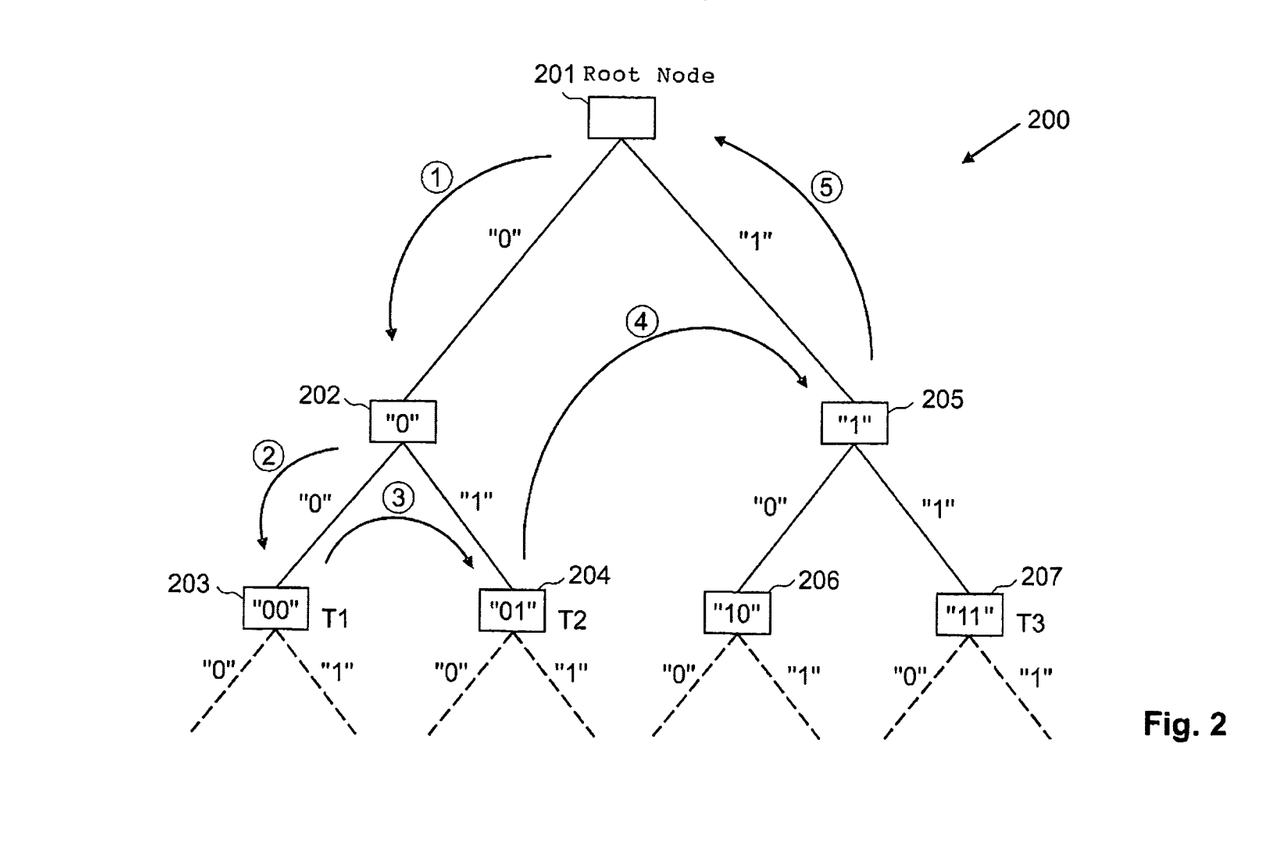
FIG. 2, a binary prefix tree used for target tag singulation.

For this purpose, FIG. 2 shows a singulation tree 200. The singulation tree 200 allows a tag reader 110 to systematically browse through the address space of an RFID system 100 in order to resolve conflicts created by collisions of responses from different target tags. For reasons of representational simplicity, only two-bit addresses are considered for target tags, although 64-, 96- or 128-bit addresses are used in practice.

Starting from a root node 201, the tag reader 110 issues read requests to the target tags 120, 130 and 140, i.e. to all target tags. This first read request does not comprise a so called prefix, which is used to isolate responses from target tags. Consequently, all three target tags 120, 130 and 140 will respond to the initial request, which results in a collision of response signals and prevents the tag reader 110 from identifying any target tags.

Thus, the tag reader 110 needs a read strategy to single out individual target tags in order to successfully read the target tag identifiers 123, 133 and 143 of the target tags 120, 130 and 140. According to the presented tree singulation algorithm, the tag reader 110 selects a first bit of a prefix. For example, the tag reader 110 follows the left branch from the root node 201 and reaches the first node 202. Thus, the next read request is issued comprising a prefix, which specifies that only target tags having a target tag identifier starting on a "0" should respond to the read request.

For the purpose of the example presented, it will be assumed that the first target tag 120 comprises a target tag identifier 123 of "00", the second target tag 130 comprises the target tag identifier 133 of "01", and the third target tag 140 comprises the target tag identifier 143 of "11".

Since there are still two target tags 120 and 130 that match the read request of the first node 202, a collision still occurs, such that the tag reader 110 needs to proceed with the singulation strategy. For this purpose, the tag reader 110 proceeds one level further down into the singulation tree 200 and reaches the second node 203 comprising the prefix "00". At the second node 203, only the first target tag 120 matches the specified prefix and responds to a request issued by the tag reader 110. Thus, the tag reader 110 can identify the first target tag 120 by means of its target tag identifier 123.

The fact that the target tag 120 was successfully identified means that the singulation strategy can backtrack to the first node 202 and follow its second branch connecting the first node 202 to the third node 204. At the third node 204, labeled with its associated prefix "01", only the second target tag 130 comprising the target tag identifier 133 will respond to a read request of the tag reader 110. Thus, in a next step, the tag reader 110 can proceed in its strategy to the fourth node 205 associated with the prefix "1".

In the example RFID system 100, only the third target tag 140 has a target tag identifier 143 matching the specified prefix "1" of the fourth node 205. Thus, no collision occurs at this stage and the third target tag 140 can be identified by the tag reader 110. There is no need to traverse the fifth and sixth nodes 206 and 207, respectively, in this scenario. Instead, after successfully reading the third target tag 140 at the fourth node 205, the singulation strategy returns to the root node 201, finishing the scan of the address range.

As detailed above, in practice, singulation trees 200 will have a much greater depth according to the length of the longest common prefix of any two target tags. This is indicated by the dashed lines below the lowest nodes of the singulation tree 200 in FIG. 2. In the worst case, the singulation tree 200 will have a depth corresponding to the bit length of the target tag identifiers of target tags. However, in practice, a singulation tree 200 will only be sparsely populated such that scanning the singulation tree 200 remains computationally feasible.

In the presented example, the anonymizer device 150 should protect the second target tag 130 from being singled out by the tag reader 110. For this purpose, the anonymizer device 150 reads the target tag identifier 133 of the target tag 130.

Reading the target tag identifier 133 can be performed in the same manner as a normal readout of the target tag 130. For example, only the second target tag 130 could be brought into the vicinity of the anonymizer device 150. Then, a reading process could be started by the anonymizer device 150, for example by starting a user initiated read procedure by pressing a button of the anonymizer device 150.

The target tag identifier 133 is stored in the memory device 153 of the anonymizer device 150. At a later time, for example when passing a hidden tag reader 110 whilst carrying the first, second and third target tag 120, 130 and 140, the anonymizer device 150 also carried by the user can prevent identification of the second target tag 130 by the tag reader 110.

For this purpose, the anonymizer device 150 detects read requests issued by the tag reader 110. As detailed above, the read request comprises a specified prefix, potentially of length zero. Once a read request is detected by the anonymizer device 150, the prefix specified therein is compared with the target tag identifiers 133 stored in the memory device 153 of the anonymizer device 150.

If the processing unit 152 determines that the tag reader 110 is trying to read out the target tag identifier 133 of the second target tag 130, it will respond to the read request by sending a response signal back to the tag reader 110, such that the response signal collides with a further response signal generated by the second target tag 130. Consequently, the singulation strategy as detailed above will not be able to successfully isolate the target tag identifier 133.

A response signal in terms of this application may be a response signal in accordance with a given protocol, such as the RFID protocol, which, although being compatible with the protocol, effectively prevents the identification of the target tag 130 as detailed above. Alternatively, a response signal out with the given protocol may be used, e.g. a wideband electromagnetic noise signal, deliberately disturbing the communication between the tag reader 110 and the target tag 130.

The response signal may interfere with the target tag identifier 133 itself, i.e. disturb an artificial echo of the first target tag 130 comprising its target tag identifier 133. Or, alternatively, it may disturb another response signal sent out by the target tag 130. For example, if the target tag 130 is selected by means of transmitting its target tag identifier 133, it may respond by sending out other data stored in the target tag 130, such as a European Article Number (EAN) back to the reader. The anonymizer device 150 may disturb this by transmitting another EAN number back to the tag reader 110.

In addition, more advanced response signals may be generated by the anonymizer device 150. For example, a multiplicity of simulated responses could be provided by the anonymizer device 150, thus occupying the tag reader 110 for a lengthy period of time, until it either runs out of memory or simply gives up on reading. In general, any action taken by the anonymizer device 150 that effectively disturbs the normal communication between the target tag 130 and the tag reader 110 may constitute a response signal within the scope of this disclosure.

In general, a tag reader 110 will abort a singulation strategy at a certain tree depth of the singulation tree 200, even if collisions can not be resolved. Thus, in this case the tag reader 110 is unable to identify the second target tag 130 being protected by the anonymizer device 150, enhancing privacy.

However, a modified tag reader 110 could be devised to locate the node in the singulation tree 200 at which a collision occur, which cannot be resolved by means of the tree singulation strategy. For example, an intelligent tag reader 110 could identify that the third node 204 is protected by means of an anonymizer device 150. In this case, the tag reader 110 could conclude that a second target tag 130 does in fact exist having a target tag sequence 133 of "01" associated with the third node 204. In this way, the privacy provided by the method detailed above is reduced.

Consequently, in order to provide even better privacy, according to an enhanced embodiment, the anonymizer device 150 also comprises a first set of tag identifiers. The processing unit 152 of the anonymizer device 150 also compares the prefix of a read request with the tag identifiers of the first set of tag identifiers. If a prefix of a read request matches any of the tag identifiers of the target tags to be protected or any tag identifier of the first set, it will respond to the read request by sending a response signal.

A response signal sent may be a "positive" response signal in accordance with a communication protocol such as the RFID protocol, simulating the presence of tags, which are in fact not present. Alternatively, the response signal sent may comprise a "negative" or disturbing signal, which deliberately disturbs a communication protocol used by the tag reader 110.

Thus, the tag reader 110 receives a predetermined number of false responses during a traversal of the singulation tree 200. Such a collection of response signals issued by the anonymizer device 150 will make it even harder for the tag reader 110 to decide, what response signals are actually transmitted by target tags 120, 130 and 140 and which are sent by the anonymizer device 150. Thus, the privacy of a person carrying the anonymizer device 150 is improved. In addition, response signals sent by the anonymizer device 150 can be manipulated to simulate further collisions, for example by sending response signals outside the RFID specification.

Different approaches can be chosen to select the members of the first set of tag identifiers. For example, tag identifiers randomly distributed throughout the address range of the RFID system 100 could be chosen. Alternatively, the members of the first set of tag identifiers could be chosen depending on data associated with the target tag identifier 133 of the target tag 130 to be protected. For example, the target tag identifier 133 could be hidden in a set of tag identifiers scattered around the target tag identifier 133, for example nodes in the vicinity of the third node 204.

Depending on the amount of information available to the anonymizer device 150, specific responses can be triggered by means of selecting the members of the first set of tag identifiers. For example, if a user of the anonymizer device 150 wants to trigger a certain behavior in a RFID system 100, he or she may deliberately cause responses for target tags known to be associated with certain manufacturers, product classes, products or the like. For example, a person trying to buy a present for somebody who is particularly interested in sports may select a profile associated with a first set of tag identifiers, all associated with sport articles. Consequently, very advanced shopping systems suggesting purchases based on target tags a customer is actually carrying can be triggered to suggest similar articles to that customer. Other situations may include customers pretending to be particularly wealthy, for example by including tag identifiers associated with particular expensive goods.

The anonymizer device 150 can also be adapted to avoid any disturbance of legitimate read request issued by a tag reader 110. For example, whilst the customer shopping for food in the supermarket wants to allow a tag reader 110 placed at the checkout till of a supermarket to scan the target tags 120 and 140 associated with food products, he or she may want to block the tag reader 110 from reading the second target tag 130 associated with a piece of clothing shopped earlier.

For this purpose, a second set of tag identifiers not to be disturbed can be specified. The anonymizer device 150 will then exclude the tag identifiers comprised in the second set from being included in the first set, such that all tag identifiers included in the second set can be successfully singled out and read by a tag reader 110.

Another problem related to privacy protection in RFID system 100 exists. This is often referred to as "tracking" or "tracing". Even if a customer prevents a tag reader 110 from identifying a particular target tag, for example the second target tag 130, he or she can still be identified, if the profile of responses generated by the anonymizer device 150 remains the same in all read situations.

For example, a first tag reader 110 installed at the entrance to a particular shop and a second tag reader 110' installed at the exit of the same shop may not be able to identify the target tag identifier 133. However, by comparing the response generated by the anonymizer device 150 in accordance with the first set of tag identifiers, they may correlate the two responses to conclude when a particular customer has entered and left the shop. In addition, tracking customers in different shops or locations becomes possible, if all tag readers 100 are connected, for example by means of a data network 113.

In order to prevent this kind of tracking, further measures can be taken by the anonymizer device 150. In particular, the anonymizer device 150 may be adapted to distinguish between the two different read situations at the entrance and exit of the shop detailed above. On detection of a change of the read situation, the anonymizer device 150 will regenerate the first set of tag identifiers, preferably modifying it in due course. Thus, the second tag reader 110' placed at the exit of the shop is unable to successfully correlate the response generated by the anonymizer device 150 later with the response generated by the anonymizer device 150 earlier at the first tag reader 110 placed at the entrance.

A change of a read situation can be determined in different ways. One example is to detect a time-out period between subsequent read requests. During one read situation read requests will be issued by a tag reader 110 with high frequency. However, in practice there will be a larger time gap between any two read situations, for example the time a customer spends shopping.

Other ways of detecting a change of the read situation include manual user input, for example, pressing a button on the anonymizer device 150, or an analysis of read strategies performed by a tag reader 110 using the processing unit 152 of the anonymizer device 150. For example, the processing unit 152 could identify that the singulation tree 200 has completely been scanned by a tag reader 110.

Figure 3:
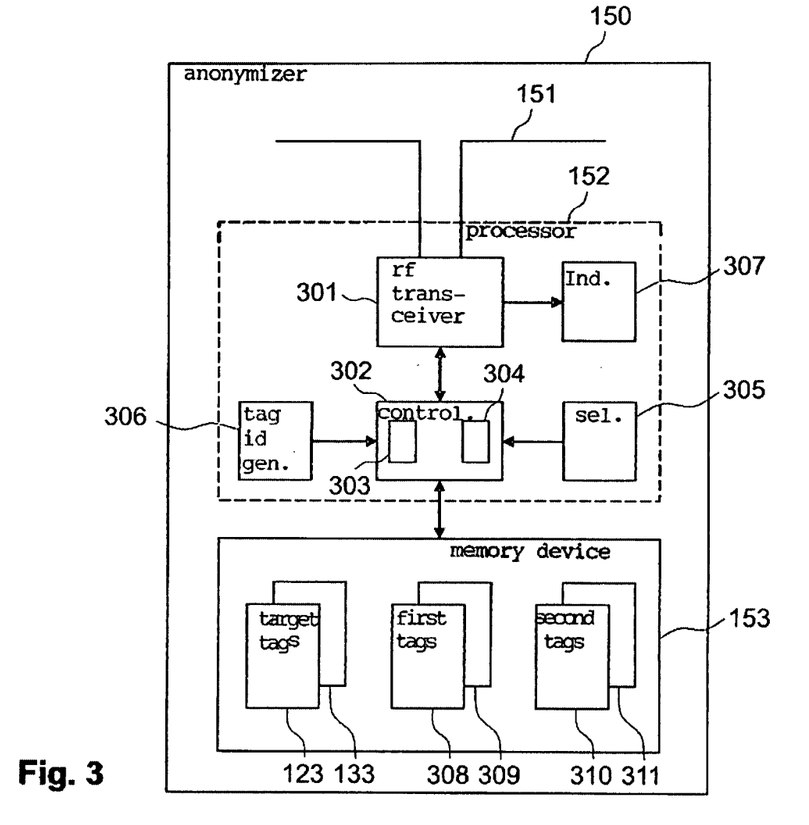
FIG. 3, a more detailed block diagram of an anonymizer device.

FIG. 3 shows a more detailed block diagram of the anonymizer device 150. The antenna 151 is connected to a radio frequency transceiver unit 301. The radio frequency transceiver unit 301 is adapted to receive and issue read requests and response signals in accordance with a particular radio protocol, for example the RFID protocol. It is further connected to a microcontroller 302, which comprises a comparator 303 and a computer program 304. The computer program 304 may be comprised on any computer readable medium, such as a RAM or ROM device, a CDROM or hard disk, embodying program instructions executable by the microcontroller 302 of the anonymizer device 150.

The microcontroller 302 is further connected to a profile selector 305 and a tag identifier generator 306. The tag identifier generator 306 may comprise, for example, a random number generator. In addition, the radio frequency transceiver unit 301 is connected to an indicator 307 that can be configured to indicate either incoming, outgoing or both kinds of radio communication over the antenna 151. Thus, in addition to its privacy function, the anonymizer device 150 can also be used as an RFID-monitor.

Together, the radio frequency transceiver unit 301, the micro controller 302, the profile selector 305, the tag identifier generator 306 and the indicator 307 form a processing unit 152.

The anonymizer device 150 further comprises a memory device 153, for storing one or several target tag identifiers 123, 133, one or several first set of tag identifiers 308, 309 and one or more second sets of tag identifiers 310, 311. The tag identifiers stored in the memory device 153 can be associated with profiles also stored in the memory device 153 and selected by means of the profile selector 305. For example, the profile selector 305 may comprise a simple user interface through which a user of the anonymizer device 150 can select a currently preferred profile comprising the target tag identifier 133, the first set of tag identifiers 308 and the second set of tag identifiers 310.

In a preferred embodiment, the anonymizer device 150 is integrated into an electronic device a user is already carrying with him or her. For example, the anonymizer device 150 may be integrated into a personal digital assistant (PDA) or mobile phone, and use some of the components already integrated into such a device, for example an antenna 151, micro controller 303 or a memory device 153.

Figure 4:
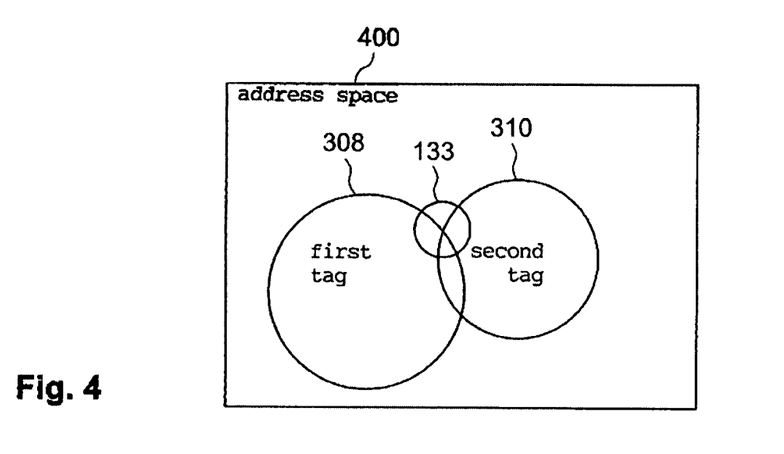
FIG. 4, a visualization of a first, a second and a target set of tag identifiers.

FIG. 4 is a diagram showing the relationships between the different sets of tag identifiers managed by the anonymizer device 150.

The first set of tag identifiers 308 is the area of the address space 400 of the RFID system 100, for which the anonymizer device 150 will create false or phantom response signals. The first set 308 corresponds to an artificial cloud of responses generated by the anonymizer device 150 either to hide a particular target tag identifier 133 within it, or to deliberately trigger a behavior desired by a person carrying the anonymizer device 150.

Depending on the intended use, the target tag identifier 133 may be inside or outside the first set of tag identifiers. The size of the first set of tag identifiers 308 determines the amount of privacy provided and disturbance caused by the anonymizer device 150. In general, there will be a tradeoff between "linkability", i.e. the possibility of tracking a carrier of the anonymizer device 150, and non-disturbance, i.e. the interference of the anonymizer device 150 with legitimate tag readers 110.

In addition, the address space 400 of the RFID system 100 may comprise a second set of tag identifiers not to be disturbed. The second set of tag identifiers 310 essentially comprises a white list of addresses, which is not to be disturbed by the anonymizer device 150. In contrast, the target tag identifier 133 comprises a black list of addresses, which is always to be disturbed by the anonymizer device 150. The first set of tag identifiers 308 is a list of additional tag identifiers to respond to in a similar way as to the target tag identifier 133.

In practice, however, the three sets of tag identifiers may intersect, be separate from one another or even be empty. Depending on policies set for the anonymizer device 150, in cases of conflicting entries, for example between members of the first and the second set of tag identifiers 308 and 310, either one could be treated with priority, depending whether data protection or non-interference is of higher importance in the particular situation.

In the following, the underlying mathematical assumptions and properties are further detailed. However, it should be understood that many alterations can be applied to the disclosed relationships by a person skilled in the art, without departing from the true spirit of the invention.

(a) Definitions and Assumption

P: complete target tag population, e.g. target tags 120, 130 and 140

SP: a set of target tags to be protected, e.g. the second target tag 133, nprot: the number of target tags to be protected, i.e. |SP|=nprot SND: target tags not disrupted, e.g. the second set of tag identifiers 310

SNDmin/max: minimum/maximum number

SB tag reads that are blocked, e.g. the first set of tag identifiers 308

R the read strategy of the tag reader 110. This comprises the ordering of reads on target tags that are present, i.e. if two target tags answer to a prefix x does it then ask x0 or x1? Does it do this with a deterministic or random strategy? For example, does it always ask x0 first?

nreads the number of reads per read situation (#RRS=nreads)

nsits the number of read situations (#RS=nsits)

Percent disruption probability that a target tag in SND will not be read if present because of SB, given the tag reader strategy R.

Percent linkability Plink[maxi, k(|SB(i)∩SB(k)|, R)>0], i.e. maximum pairwise linkability probability given tag reader strategy R. Note that there is a link, if the same tag identifier is reported in two different read situations because all tag identifiers are unique. This is what is referred to as "strict linkability" because it relies on only one common tag identifier.

Lmin % maximum linkability of person carrying the target tags 120, 130 and 140 and the anonymizer device 150 in percent Dmin % maximum disruption of a tag reader 110 in percent The objectives of keeping the linkability and disruption below the above stated threshold is achieved by choosing a first set of target tags SB(r) in a given read situation r and changing SB between read situations i and j, so SB(i)≠SB(j).

Over many read situations, one is looking at expected values, because SND will become a distribution.

(b) Solving for SB—First Case: R is Random

All target tag identifiers are equivalent from tag reader 110 point of view (i.e. which is read first).

Choose SB at random from P\SND with size nblock=|SB| chosen as follows

Reduce disruption

Disruption is change in visibility of SND

Probability see SND with |SB|=0 and no anonymizer of SP is P(SND, no, 0)=|SND|/|SND U SP|

Probability see SND with |SB|≠0 and constant anonymizer of SP is P(SND, yes, n)=|SND\(SP U SB)|/|SND U SP U SB|

Disruption [0,1] is change with blockers Disruption (SND, n)=1−P(SND, yes, n)/P(SND, no, 0)

Reduce linkability

Linkability is percent chance see at least one common target tag identifier in two read situations each with nreads, P[nlinkable=k]=C(nprot,k)C(nother, nreads−k)/C(ntot, nreads)

$$P(k_1, \ldots, k_{nsits}) = \prod_{i=1}^{i=nsits} P(k_i)$$

Probability of NO match with two read situations is:
P[match, 2]=Sum(k=1, nreads)Sum(l=1, nreads)C(nprot−k, 1)/C(nprot, 1)

NON-Linkability for (n=nprot) is:

$$\text{Non-}Linkability(nreads, nsits) = \sum_{k_1=1}^{nreads} \ldots \sum_{k_{nsits}=1}^{nreads} P(k_1, \ldots, k_{nsits}) \frac{\binom{n}{k_1} \ldots \binom{n - \sum_{i=1}^{i=nsits-1} k_i}{k_{nsits}}}{\binom{n}{k_1} \ldots \binom{n}{k_{nsits}}}$$

For low linkability P( ) must be low, because generally the last term will be very close to one with a small number of target tags to protect and will get worse the smaller this number is.

To solve for SB scan over increasing values of |SB| until either your criteria are satisfied or you show it is infeasible.

(c) Solving for SB—Second Case: R is Deterministic & Constant
  Deterministic reading creates an ordering on the target tag identifiers, say R(i) is the order in which the ith target tag identifier in numerical order is read.
  Consider disruption first:
    Proportion of reads from SND with |SB|=0 for nreads is P(SND, 0)=1−(|{nprot(j):R(nprot(j))<Max(R(smin (nreads)))|/nreads)
    Actual disruption, i.e. how it gets worse P(SND, nblock)= (P(SND, 0)−|{nblock(j):R(nblock(j))<Max (read in nreads))|)/P(SND, 0) i.e. how many blockers get into those read?
    Chose block(j) to reduce P(SND, nblock) thereby for reduced disruption.
  Linkability:
    Only have mini(R(prot(i))) places to use because target tag identifiers are unique so the first target tag identifier seen creates linkability.
    If max(R(smin))<mini(R(prot(i))) and |smin|>nreads have perfect non-linkability because never get two target tags to be protected—and zero disruption.
    Use nprot target tag identifiers chosen differently in each read situation (i.e. SB(i) have no mutual intersections) so have perfect non-linkability
    SP must be chosen with min(R(SP)) as high as possible to reduce disruption and with |SP| sufficient for non-linkability
    In this case (R deterministic) linkability is 0 or 1 with no intermediate possibilities (assuming constant number of reads per situation etc.).
  In an extended case, where SND is a distribution, this can be performed once per read situation as detailed above.
(d) Solving for SB—Second Case: R is Deterministic & Changing
  Assuming that you do not wish to change SB for each read situation then you simply replace R(tag) by mini(Ri(tag)) to solve the problem in an extension to the solution described above.
(e) Other Cases and Extensions
  Case 3: R deterministic & constant but unknown (known only statistically)
    3a) learn R
    3b) don't
    3c) R different in each read situation (more difficult to get non-link-ability because of birthday problem)
  Case 4: R unknown stochastic or deterministic (known only statistically over both possibilities)
    4a) learn R
    4b) don't
  Extensions
    Threshold-Linkability: instead of saying that linkability occurs with certainty as soon as any target tag identifier (positive or negative) is seen twice, say linkability occurs when k different target tag identifiers are seen twice, i.e. k is the threshold.
    Value-Linkability: define a value of linkability that you are optimizing relative to.
    Entropy-Linkability: define linkability by the reduction in entropy that the reads create relative to the person's movements.
      Could define this one either way round (reduction relative to perfect knowledge or increase relative to none).
(f) Extension: Controlled Generation of False Identifiers
  Consumer device has secret key x and pseudo-random function PRF
    tag reader 110 who knows x can determine s from any two IDs i,j $\overline{SB}$
    Additionally can use a special s to indicate person identity explicitly but still hide target tag identities as before.
(g) Case 3b: R Unknown But Deterministic, No Learning
  Let F(R) be the distribution function on R.
    This means that R(tag) is now a distribution rather than a single number giving the order in which target tag identifiers are read.
    Note that R can be impossible to learn. E.g. R is a cryptographically random sequence. In this case you cannot tell whether future reads will follow a pattern or not.
  Disruption
    With |SB|=0 and no anonymizer then expected number of SND seen with nreads is (where F(R) is the distribution function), E[SND, nreads]=∫R N(SND, SP, no, 0, R, nreads)dF(R)
    Similarly when SB≠0 we have the equivalent formula.
    N.B. the N( ) are the deterministic functions we have from Case 2.
    Then disruption is replaced by expected disruption which we define as:
      E[disruption]=∫R 1−N(SND, SP, yes, SB, R, nreads)/ N(SND, SP, no, 0, R, nreads) dF(R)
    Choice of SB? Brute force method is to chose SB at random and then test against both criteria.
  Linkability: use probability distribution function on R

The invention claimed is:

1. A computer-implemented privacy method, comprising steps of:
  an anonymizer device reading at least one data value for a target tag that is to be protected, wherein the at least one data value comprises a target tag identifier of the target tag,
  the anonymizer device generating a first set of tag identifiers;
  the anonymizer device detecting a read request satisfying a specified condition, whereby a read request comprising a specified prefix is detected;
  the anonymizer device comparing the specified prefix to the target tag identifier and to all tag identifiers of the first set of tag identifiers; and
  the anonymizer device responding to the read request by sending a response signal if the specified prefix of the read request matches at least one of the target tag identifier and any one of the tag identifiers of the first set of tag identifiers, such that the response signal collides with a further response signal of the target tag.

2. The privacy method according to claim 1, wherein:
  the first set of tag identifiers is generated based on a random distribution of tag identifiers.

3. The privacy method according to claim 1, wherein:
  the first set of tag identifiers is generated based on data associated with the target tag identifier.

4. The privacy method according to claim 1, wherein:
  the first set of tag identifiers is based on a user selected profile.

5. The privacy method according to claim 1, further comprising:
  detecting a change of a read situation, and
  generating a new first set of tag identifiers for each detected read situation.

6. The privacy method according to claim 5, wherein:
  the change of the read situation is detected when no read request is received within a given time period.

7. The privacy method according to claim 5, wherein the change of the read situation is indicated by user input.

8. The privacy method according to claim 1, further comprising
specifying a second set of tag identifiers which are not to be disturbed, wherein tag identifiers in the second set are excluded from the first set and wherein no response signal is sent if the read request is determined to be directed to a tag having a tag identifier in the second set of tag identifiers.

9. A privacy device, comprising:
an anonymizer device tag reader adapted to read a target tag identifier of a target tag to be protected,
a memory device, operationally connected to the tag reader and adapted to store at least one read target tag identifier,
an anonymizer device tag identifier generator adapted to generate a first set of tag identifiers and store the first set of tag identifiers in the memory device,
a read request detector, adapted to detect a read request comprising a specified prefix,
a comparator, operationally connected to the memory device and the read request detector and adapted to compare one or more tag identifiers stored in the memory device with the specified prefix of the detected read request, and
a response signal generator, operationally connected to the comparator and adapted to generate a response signal if a comparison performed by the comparator results in a match, as determined when the specified prefix matches at least one of the target tag identifier and any one of the tag identifiers in the first set of tag identifiers.

10. The privacy device according to claim 9, further comprising:
a profile selector adapted to select a profile associated with a first set of tag identifiers.

11. The privacy device according to claim 9, wherein the read request detector is further adapted to detect a change of a read situation, and wherein, in response to detection of a change in the read situation, the tag identifier generator regenerates the first set of tag identifiers for each detected read situation.

12. The privacy device according to claim 11, wherein the read request detector detects a change of the read situation when no read request is received within a given time period.

13. The privacy device according to claim 11, wherein the device further comprises a user input interface and wherein a change of the read situation is indicated by user input.

14. A non-transitory computer program device readable by machine and storing program instructions that, on execution using a processing device of a privacy device perform the steps of the privacy device:
generating a first set of tag identifiers;
reading at least one data value for a target tag that is to be protected, wherein the at least one data value comprises a target tag identifier of the target tag;
detecting a read request satisfying a specified condition, whereby a read request comprising a specified prefix is detected;
comparing the specified prefix to the target tag identifier and to all tag identifiers of the first set of tag identifiers; and
responding to the read request by sending a response signal if the specified prefix of the read request matches at least one of the target tag identifier and any one of the tag identifiers of the first set of tag identifiers, such that the response signal collides with a further response signal of the target tag.

15. The non-transitory computer program device according to claim 14, further comprising instructions to perform steps of:
detecting a change of a read situation, and
generating a new first set of tag identifiers for each detected read situation.

16. The non-transitory computer program device according to claim 15, wherein the change of the read situation is detected by one of no read request being received within a given time period and user input.

17. The non-transitory computer program device according to claim 14, further comprising instructions to perform steps of:
specifying a second set of tag identifiers which are not to be disturbed, wherein tag identifiers in the second set are excluded from the first set, and wherein no response signal is sent if the read request is determined to be directed to a tag having a tag identifier in the second set of tag identifiers.

* * * * *